United States Patent

Villard, Jr.

[15] 3,704,420

[45] Nov. 28, 1972

[54] AUTOMATIC FREQUENCY CONTROL FOR SUPPRESSED CARRIER RECEIVERS

[72] Inventor: Oswald G. Villard, Jr., Woodside, Calif.

[73] Assignee: The United States of America as represented by the Secretary of the Navy

[22] Filed: July 20, 1970

[21] Appl. No.: 56,594

[52] U.S. Cl. ....................................325/329, 329/50

[51] Int. Cl. ................................................H04b 1/68

[58] Field of Search ........179/15 FS; 324/78 F, 78 N; 325/49, 50, 329–331, 423, 316, 433, 435, 476, 474; 329/50

[56] References Cited

UNITED STATES PATENTS

| | | | |
|---|---|---|---|
| 2,938,114 | 5/1960 | Krause | 325/329 |
| 3,456,196 | 7/1969 | Schneider | 325/329 |
| 3,275,940 | 9/1966 | Kahn | 325/330 |

*Primary Examiner*—Albert J. Mayer

*Attorney*—R. S. Sciascia and Charles D. B. Curry

[57] ABSTRACT

An automatic frequency control circuit for receivers of suppressed carrier SSB voice signals. First, the incoming signals are rectified in a conventional AM diode detector. The audio output, for vowels and voiced sounds, will consist primarily of the fundamental and harmonics of the vocal cord vibrations. This harmonic spectrum is then compared with the analogous voice harmonics at the output of a product detector. If the compared voice harmonics are mismatched in audio frequency, then an error signal is generated which is used to adjust the frequency of the locally generated carrier signal which is injected into the product detector. Frequency adjustment will continue until the error signal approaches zero and there is no voice harmonic frequency mismatch. One embodiment of the present invention employs a phase comparison of the voice harmonics and another embodiment employs a frequency comparison of the voice harmonics.

2 Claims, 10 Drawing Figures

Figure 1:
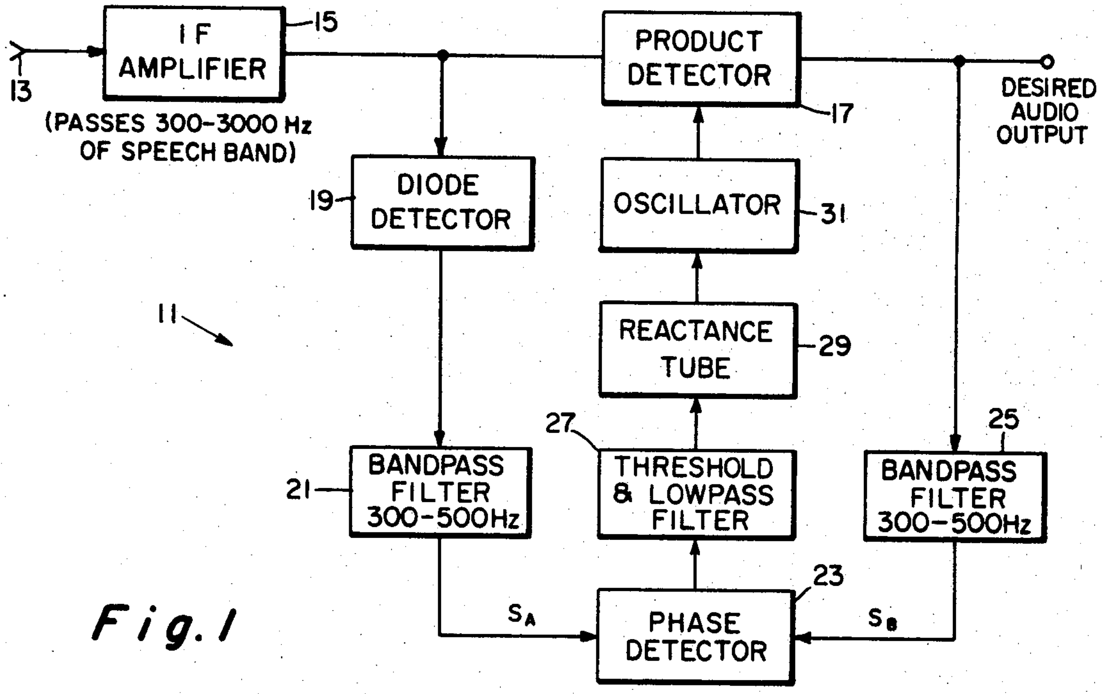

INVENTOR
OSWALD G. VILLARD JR.
BY Charles [signature]
ATTORNEY

AUTOMATIC FREQUENCY CONTROL FOR SUPPRESSED CARRIER RECEIVERS

The invention described herein may be manufactured and used by or for the Government of the United States of America for governmental purposes without the payment of any royalties thereon or therefor.

The present invention relates to automatic frequency control techniques and more particularly to sideband operated automatic frequency control for receivers of suppressed carrier SSB voice signals.

One of the difficulties with prior SSB voice communications is that a frequency error may exist between the transmitted carrier and the reinserted carrier at the receiver. This results in distortion of the voice and if there is sufficient frequency mismatch then complete loss of intelligence. One form of communication in which this is a problem is when one terminal of a link is in a rapidly moving aircraft or satellite and the doppler shift is large, time-varying, and difficult to predict. Another situation in which this occurs is in marine, aeronautical, or mobile radiotelephony where a frequency mismatch between transmitter and receiver results from the use of inexpensive, relatively unstable equipment.

The power and radio-frequency economics of suppressed-carrier voice transmission are at the present time being extended to a steadily increasing number of users. The need for single sideband (SSB) technology is especially great in the aeronautical, maritime, and mobile services many of which are restricted to the lower HF frequency range for reasons of propagation. Alleviation of crowding by widespread adoption of SSB has been held up by the difficulty of providing, at reasonable cost, equipment capable of operating in the mobile environment with adequate frequency stability. When, as a result of frequency drifts of oscillators any where in the system, the reinserted carrier is offset from the correct value by even 20 Hz, voice naturalness suffers; if the misalignment is as much as 100 Hz, intelligibility begins to suffer. Although experienced communicators hardly notice mistuning of as much as 100 Hz, and suffer little loss of intelligibility, inexperienced communicators on the other hand have much more trouble and are disturbed by their inability in this situation to recognize the voice of the person at the other end of the circuit. Such individuals also tend to find manual tuning and adjustments, for the purpose of compensating for oscillator drift, burdensome, especially when the correct setting changes with time as a result of thermal drift or some other cause. Manual adjustment becomes especially impractical when a large number of stations, some fixed and some mobile, must be contacted in a short space of time.

The method used by present technology to provide automatic frequency control in these situations is for the transmitter to radiate a pilot carrier of reduced amplitude and for the receiver to search for and lock to the frequency of the pilot carrier. Disadvantages of this technique include the extra receiver adjustment, power loss at the transmitter, and, most important, there is heterodyne interference caused by the reduced carriers before locking takes place.

The present invention overcomes these difficulties by providing an automatic frequency control circuit which uses the natural frequencies of the voice to provide automatic frequency control.

Briefly, the present invention comprises an automatic frequency control circuit for receivers of suppressed carrier SSB voice signals. By use of a diode detector, the circuit generates a voice harmonic spectrum of the transmitted voice signal from the fundamental and at least one of the vocal-cord harmonics at the output of the IF amplifier. The generated audio harmonic spectrum is then compared with the audio voice harmonics at the output of the product detector. If the compared voice harmonics are mismatched in frequency, then an error signal is provided which is used to adjust the frequency of the locally generated carrier signal which is injected into the product detector. Frequency adjustment will continue until the error signal approaches zero and there is little or no voice harmonic mismatch. One embodiment of the present invention employs a phase comparison of the voice harmonics and another embodiment employs a frequency comparison of the voice harmonics.

The phase comparison technique employs a diode detector connected to the output of the IF amplifier wherein the output of the diode detector is connected to a phase detector through a band pass filter. In addition, the output of the product detector is connected through a band pass filter to the same phase detector. An error or correction signal derived from the output of the phase detector is applied in series through a threshold and low pass filter circuit and a reactance tube to control the frequency of an oscillator. The output of the oscillator is connected to the product detector to reinsert the carrier frequency and the error signal varies the oscillator frequency until the two sets of voice harmonics match and there is no phase difference or error.

In the frequency comparison circuit, a pair of frequency meters is used in place of the phase detector to compare the instantaneous frequencies of the two sets of voice harmonics for the purpose of deriving the desired error signal. In practice, the frequency meters simply count the zero-crossings per unit time of the two complex waveforms.

The phase comparison circuit is particularly useful for fine control and in situations where the mismatch between the transmitter carrier frequency and the reinserted frequency of the receiver is less than half the frequency difference between adjacent voice harmonic frequencies, which is normally about 100 Hz. The frequency comparison circuit is particularly useful when the frequency mismatch is greater than this. The combination of the phase and frequency comparison circuits has been found to be especially useful when fine control is desired and a relatively large frequency mismatch is encountered.

Other objects, advantages and novel features of the invention will become apparent from the following detailed description of the invention when considered in conjunction with the accompanying drawings wherein:

FIG. 1 is a block diagram of the present invention, using the phase-comparison technique.

Figure 3:
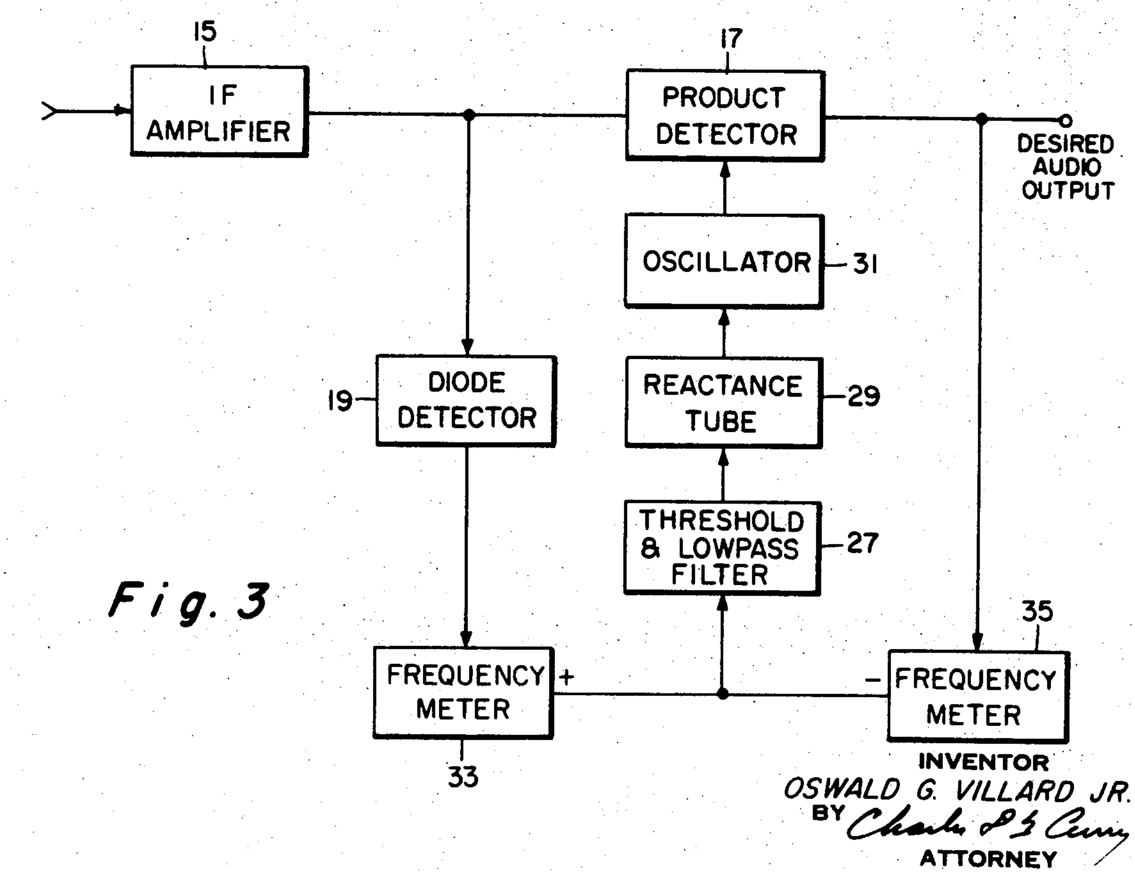
Figure 4:
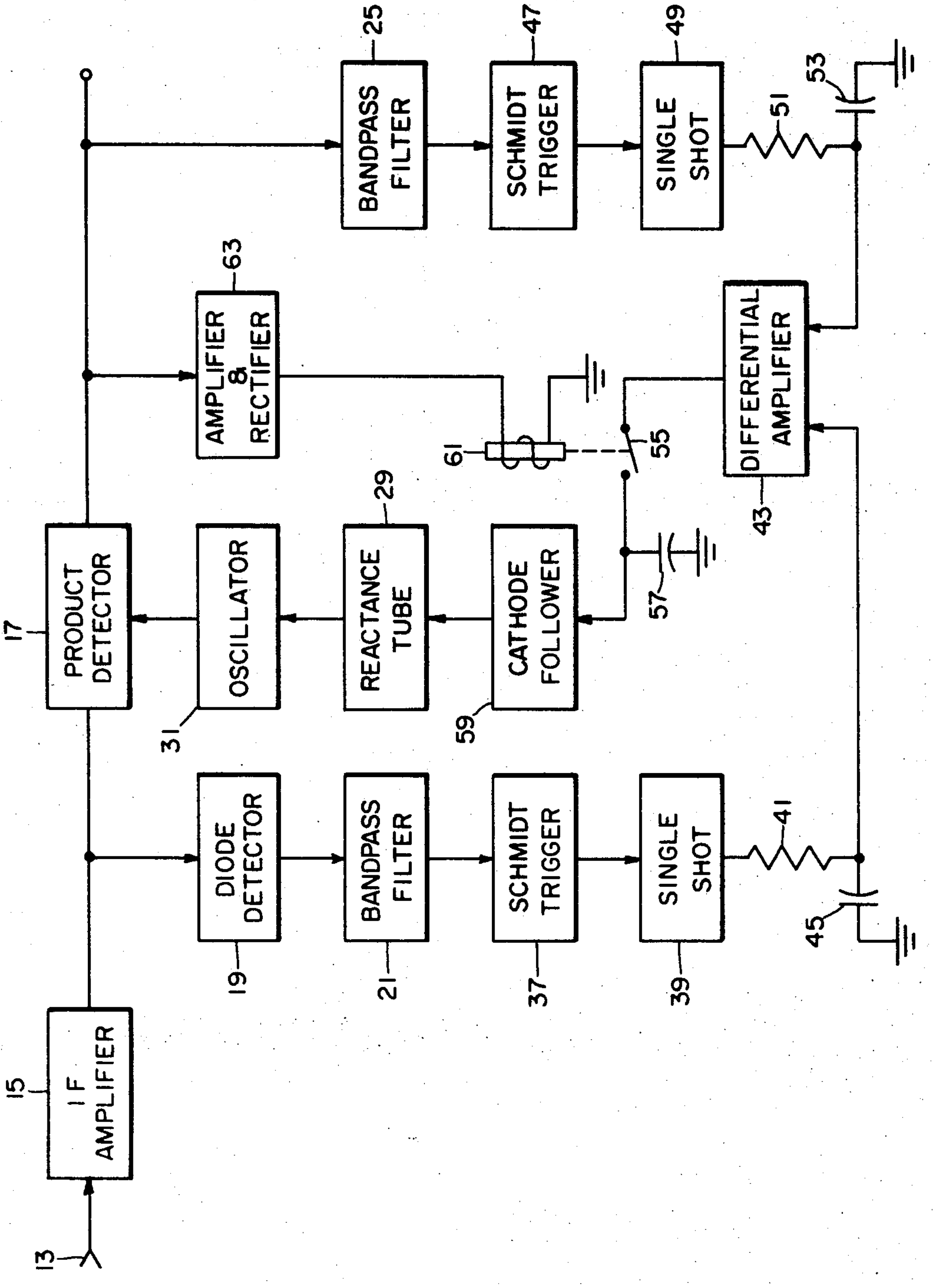

FIGS. *2a* through *2g* are diagrams illustrating the operation of the FIG. 1 circuit;

FIG. 3 is a block diagram of another embodiment of the present invention which uses the frequency-comparison technique; and FIG. 4 is a block diagram showing in some detail an embodiment of FIG. 3 which has been successfully operated.

In FIG. 1 is a block diagram illustrating one embodiment of the present invention. In this embodiment the input signal to the receiver system 11 is a suppressed carrier single sideband voice signal that is received by antenna 13. The output of antenna 13 is applied to the input of IF amplifier 15 which passes 300 to 3,000 Hz, for example, of speech band. The output of IF amplifier 15 is applied in parallel to the input of product detector 17 and to the input of diode detector 19. Diode detector 19 functions to beat together the various spectral components of the speech to re-create the fundamental vibration frequency of the incoming signal and, in addition, an association of harmonic spectrum as will be subsequently described in respect to FIGS. 2*a* through 2*g*. This beating and re-creation of the fundamental and an associated harmonic spectrum may also be achieved when the signal is processed by an AM receiver, for example.

The output of diode detector 19 is applied to the input of bandpass filter 21, which passes 300 to 500 Hz, for example, of speech band. The output of band pass filter 21 is referred to as signal $S_A$ and is applied to one of the inputs of phase detector 23. The output of product detector 17 is applied to the input of band pass filter 25, which passes 300 to 500 Hz, for example, of speech band. The output of band pass filter 25 is referred to as $S_B$ and is applied to the other input of phase detector 23.

With respect to filters 21 and 25 it should be noted that they could be broadband or they could be eliminated. However, it is desirable to use the band pass filter with the specified frequency range in order to reduce the disturbing effect of broadband, high frequency speech signals, such as are formed when speaking sibilants (the letters *s* and *z*) and fricatives (the letter *f*). In addition, the filter rejects the low frequency or nearly D.C. signals resulting from the diode rectification process.

The output of phase detector 23 is applied to the input of threshold and low pass filter device 27. The function of the threshold is to prevent system frequency correction if no speech is taking place. However, when speech occurs the output of phase detector 23 will exceed the threshold value and a correction or error signal will appear at the output of device 27. The filter segment of device 27 may reject frequencies in excess of 50 Hz, for example.

The output of threshold and low pass filter device is applied to the input of reactance tube 29 which operates on oscillator 31 so as to control its frequency. The output of oscillator 31 is applied to product detector 17 to provide the reinserted carrier signal. The phase difference between signals $S_A$ and $S_B$ is sensed by phase detector 23 which provides a correction signal to oscillator 31 so that their phase difference becomes zero. In this manner the frequency of oscillator 31 is made to very closely match the frequency of the transmitter thus re-establishing the proper carrier signal in the otherwise carrierless signal received by antenna 13 of receiver 11.

The basic principle upon which the circuit operates will now be described in reference to FIGS. 2a through 2g. At the outset it should be noted that the loudest speech sounds are derived from vibration of the vocal cords which are extraordinarily rich in harmonics. The fundamental frequency of the vocal cord vibration lies in the range of from about 90 to about 150 Hz depending on the speaker. In the present invention the suppressed carrier signal sideband voice signal is diode rectified and the various spectral components are beat together to re-create the fundamental vibration frequency and, in addition, a new harmonic spectrum. This re-creation is to a first approximation independent of the receiver tuning in the same way that the intelligibility of an AM signal is not strongly affected by moderate detuning of a receiver. In this manner it is possible to derive from the diode-rectified voice side frequencies a running reference against which the correctness of the tuning of the reinserted carrier in the SSB product detector may be compared.

Figure 2A:
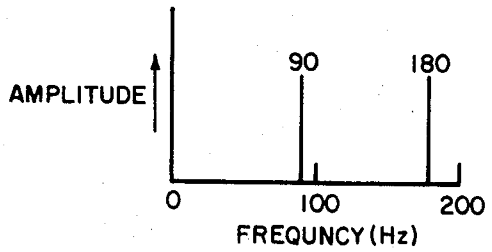

In FIG. 2*a* is illustrated the spectrum of the simplest possible approximation of a speech wave form, namely, a 90 Hz fundamental and a harmonic at 180 Hz. In FIG. 2*b* is shown the envelope of this signal after translation to any convenient RF or IF frequency. The envelope of FIG. 2*b* is diode demodulated by diode detector 19 of FIG. 1 with a resultant signal as shown in FIG. 2*c*. From this it can be seen that the original fundamental and harmonic have been re-created and some new harmonics have been added as illustrated in FIG. 2*d*. This process is independent of the amount of frequency translation (receiver tuning), provided that the translation is not so extreme that one of the original side frequencies falls completely outside the receiver pass band and is thus rejected completely.

Figure 2E:
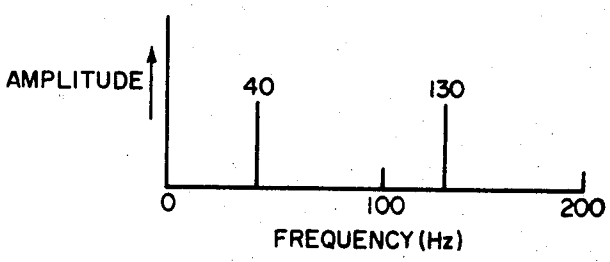
Figures 2B, 2F:
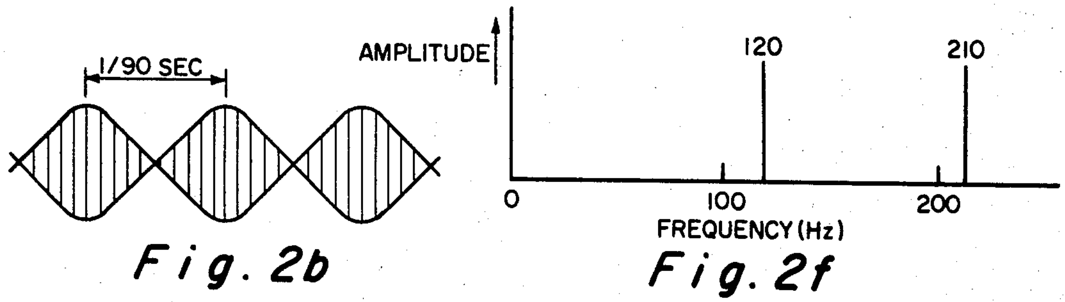
Figure 2C:
Figure 2G:
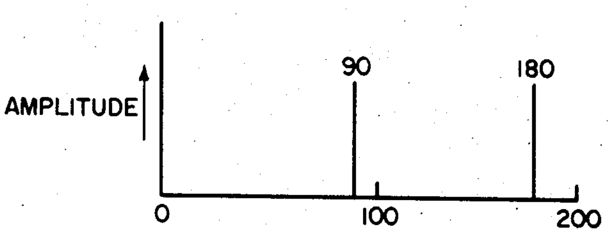
Figure 2D:
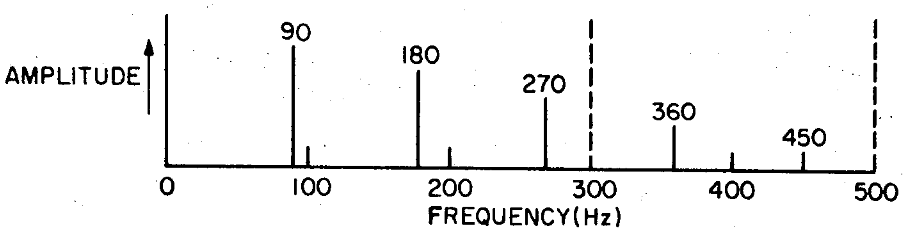

In FIG. 2*e* is illustrated the output of the product detector 17 when the reinserted carrier (from oscillator 31) is mistuned to one side and in FIG. 2*f* is illustrated the output of the product detector 17 when the reinserted carrier is mistuned to the other side. By comparing FIGS. 2*e* and 2*f* with FIG. 2*a* it is clear that the spectral components are not harmonically related when the reinserted carrier is mistuned. That is, the fundamental and harmonic of FIG. 2*e* should be 40 and 80 Hz (rather than 40 and 130 Hz) to correspond. Also, the fundamental and harmonics of FIG. 2*f* should be 120 and 240 Hz (rather than 120 and 210 Hz) to correspond. It is therefore clear that the signal spectrum of FIGS. 2*e* and 2*f* are distorted but this distortion is what makes it possible to detect the phase difference in phase detector 23 of FIG. 1. FIG. 2*g* represents the output of the product detector 17 when the reinserted carrier (from oscillator 31) is tuned to the frequency of the carrier frequency of the transmitter. The present invention maintains the output signal spectrum of product detector 17 as shown in FIG. 2*g* when the output of amplifier 15 is as illustrated in FIG. 2*a*.

It should be noted that the wave forms of FIGS. 2*a* through 2*g* are a gross oversimplification; however, this same general behavior is encountered in the case of speech wave forms. In FIG. 1, the IF of receiver 15 is assumed to pass only 300 to 3,000 Hz of the input speech band, whereas the band pass filters 21 and 25 pass 300 to 500 Hz of the input speech band which tends to reject sibilants and other frequencies not essential to the phase detector operation.

In actual practice the portion of the spectrum used in the FIG. 1 circuit is between 300 to 500 Hz as illustrated by the dotted lines of FIG. *2d*. It has been found that there is ample signal amplitude in this frequency range (even though the fundamental and lower harmonics may have somewhat greater amplitude) and filtering frequencies below 300 Hz prevents interference by DC components.

One difficulty encountered in the phase detection technique used in the FIG. 1 embodiment is that the phase detector does not make a distinction between harmonics. That is, it will obtain a lock when the reinserted frequency setting is in error by some multiple of the vocal cord vibration frequency. However, it maintains a very small error once within 90 Hz of the standard frequency in the example given.

An alternative embodiment of the present invention is illustrated in FIG. 3. In this embodiment similar reference numerals to those shown in FIG. 1 represent similar elements that operate in a similar manner. This embodiment differs from that of FIG. 1 in that automatic frequency control is achieved by frequency difference measurement or frequency error rather than by phase error. In the FIG. 3 embodiment the input of frequency meter 33 is connected directly to the output of diode detector 19 and the input to frequency meter 35 is connected directly to the output of product detector 17. The outputs of frequency meters 33 and 35 are connected to the input of threshold and low pass filter 27. These frequency meters are in effect zero-crossing-rate counters. The outputs of these meters are shown as having opposite polarities so that when tuning is correctly set there is no net voltage available to change the frequency of the voltage-controlled oscillator. The frequency meters will normally include signal limiting or clipping circuits associated with the crossing-rate counters. It has been found that the zero-crossing rate is very markedly a function of the reinserted carrier frequency. The FIG. 3 embodiment may include two bandpass filters respectively connected between diode detector 19 and frequency meter 33 and between product detector 17 and frequency meter 35 to isolate all but one or two components of each output spectrum. Such filtering rejects sibilants as previously described. The average frequency differences of the two signals can of course be measured by the use of conventional FM discrimination circuitry.

In FIG. 4 is illustrated a more detailed embodiment of the present invention employing the frequency error technique. In this embodiment the output of band pass filter 21 is applied to schmidt trigger 37 the output of which is applied to single shot multivibrator 39 which together comprise a frequency meter. The output of multivibrator 39 is applied through resistor 41 to the input of differential amplifier 43. Capacitor 45 is connected from one side of resistor 41 to ground and together with resistor 41 functions as a low pass filter. The output of band pass filter 25 is applied to schmidt trigger 47 the output of which is applied to single shot multivibrator 49. Resistor 51 and capacitor 53 together function in the same manner as resistor 41 and capacitor 45.

The output of differential amplifier 43 is applied through switch 55 to one side of capacitor 57 and to the input of cathode follower 59 the output of which is connected to reactance tube 29. Switch 55 is operated by selenoid 61 which is activated by amplifier and rectifier 63. When a voice signal is received, switch 55 is closed and the control circuit is placed into operation. However, when no voice signal is received, switch 55 is open and oscillator 31 maintains the same frequency since no correction signal is applied. The input impedance of cathode follower 59 is very high, so that the charge across capacitor 59 changes very slowly. The schmidt trigger and single shot multivibrator pairs function as frequency meters in the same manner as in the FIG. 3 embodiment.

It is to be understood that a combination device may be used that employs features of both the FIG. 1 embodiment and the FIGS. 3 or 4 embodiments. The FIG. 1 embodiment provides a high degree of accuracy but is not effective if there is a large frequency mismatch. The FIGS. 3 and 4 embodiments provide a correction for large frequency mismatches but is not as accurate as the FIG. 1 embodiment. It has been found that combining both techniques provides an automatic frequency control that is both very accurate and provides a correction for large frequency mismatches. It is also to be understood that the IF amplifier shown in each of the embodiments may be replaced with an RF amplifier or a simple band pass filter circuit.

What is claimed is:

1. An automatic frequency control device for suppressed carrier receivers for reception of a transmitted suppressed-carrier SSB voice signal comprising:
   - a. a device for processing the incoming voice signal;
   - b. a product detector operatively connected to the output of said device;
   - c. an oscillator operatively connected to said product detector for reinserting a carrier signal;
   - d. a diode detector operatively connected to the output of said device for creating an audio harmonic spectrum from the fundamental and at least one of the voice harmonics in the output signal of said device;
   - e. a first frequency detector operatively connected to the output of said diode detector and a second frequency detector operatively connected to the output of said product detector;
   - f. a differential amplifier operatively connected to the outputs of said first and second frequency detectors for comparing the harmonic spectrum of said diode detector with the harmonic spectrum of the output of said product detector and providing an error signal when said harmonic spectrums are mismatched;
   - g. said differential amplifier being operatively connected to said oscillator for controlling the frequency of said oscillator to reduce said error signal to about zero;
   - h. first means operatively connected to the output of said product detector for disconnecting the output of said differential amplifier from said oscillator when no voice signals are being received by said device and connecting the output of said differential amplifier to said oscillator when voice signals are being received by said device; and
   - i. said first means comprises an amplifier rectifier device, a solenoid and a switch, the input of said amplifier device being operatively connected to the output of said product detector, the output of said amplifier rectifier device being operatively connected to said solenoid for actuating said switch, said switch being positioned between the output of said differential amplifier and said oscillator.

2. The device of claim 1 wherein:

a. said first and second frequency detectors comprising, respectively, first and second trigger circuits and first and second single shot multivibrators;

b. the output of said diode detector is operatively connected to the input of said first trigger circuit, the output of which is connected to the input of said first multivibrator, the output of which is connected to one input of said differential amplifier; and c. the output of said product detector is operatively connected to the input of said second trigger circuit, the output of which is connected to the second multivibrator, the output of which is connected to another input of said differential amplifier.

* * * * *